United States Patent
Coscarella

(10) Patent No.: US 7,731,242 B2
(45) Date of Patent: Jun. 8, 2010

(54) PIPE CLAMP WITH BUILT IN TEST FITTING

(76) Inventor: Gabe Coscarella, 15703 - 64 Street NW, Edmonton, AB (CA) T5Y 2N5

( * ) Notice: Subject to any disclaimer, the term of this patent is extended or adjusted under 35 U.S.C. 154(b) by 179 days.

(21) Appl. No.: 12/018,153

(22) Filed: Jan. 22, 2008

(65) Prior Publication Data

US 2008/0191468 A1 Aug. 14, 2008

(30) Foreign Application Priority Data

Feb. 14, 2007 (CA) .................................. 2582655

(51) Int. Cl.
*F16L 21/00* (2006.01)

(52) U.S. Cl. .................. 285/236; 285/406; 285/420; 285/917; 137/315.29; 138/94.3; 138/99; 251/326

(58) Field of Classification Search ................ 285/110, 285/236, 369, 372, 417, 418, 421, 917, 373, 285/406, 419, 420; 137/330, 315.01, 315.29; 138/94, 94.3, 99, 109; 251/326, 327, 328, 251/334; 174/84 R, 84 S, 85
See application file for complete search history.

(56) References Cited

U.S. PATENT DOCUMENTS

| | | | | |
|---|---|---|---|---|
| 1,971,649 A | * | 8/1934 | Furman et al. ................. | 29/520 |
| 3,749,108 A | * | 7/1973 | Long ........................ | 137/15.17 |
| 3,860,038 A | * | 1/1975 | Forni .......................... | 138/94.3 |
| 3,907,341 A | * | 9/1975 | Schoepe ..................... | 285/236 |
| 4,332,271 A | * | 6/1982 | Rohr ...................... | 137/315.22 |
| 5,246,064 A | * | 9/1993 | Hoshino et al. ............. | 165/146 |
| 5,524,663 A | * | 6/1996 | Walsh et al. ............. | 137/15.23 |
| 5,563,374 A | * | 10/1996 | Hubert ....................... | 174/84 R |
| 5,582,200 A | * | 12/1996 | Kimpel et al. ............. | 137/375 |
| 6,234,007 B1 | * | 5/2001 | Pampinella ................. | 73/49.8 |
| 6,622,747 B2 | * | 9/2003 | Sato et al. ................ | 137/15.09 |
| 6,655,413 B2 | * | 12/2003 | Condon et al. ............. | 138/94.3 |
| 6,672,139 B2 | * | 1/2004 | Pampinella ................. | 73/49.8 |
| 6,997,041 B1 | * | 2/2006 | Metzger et al. ................. | 73/37 |
| 7,264,020 B2 | * | 9/2007 | Wolk ........................... | 138/90 |
| 7,325,442 B1 | * | 2/2008 | Pampinella et al. .......... | 73/49.8 |

\* cited by examiner

*Primary Examiner*—James M Hewitt
*Assistant Examiner*—Gwendolyn D Fournet
(74) *Attorney, Agent, or Firm*—Christensen O'Connor Johnson Kindness PLLC

(57) ABSTRACT

A pipe clamp includes a deformable cylindrical sealing sleeve having a continuous side wall with a slotted opening extending 180 degrees around the circumference of the side wall adapted to receive a gate valve plate. The slotted opening has protruding lips bordered by clamping wedges. Clamps are provided for clamping the sealing sleeve to a pipe. Pressure members are provided. A clamping force with pressure members upon the clamping wedges to clamp the lips into a closed position thereby creating a fluid tight seal when the gate valve plate is removed.

12 Claims, 4 Drawing Sheets

PIPE CLAMP WITH BUILT IN TEST FITTING

FIELD

The present application relates to a pipe clamp which has a built in test fitting.

BACKGROUND

Pipe clamps are used to connect in end to end relation two pipes. Test fittings are installed to isolate portions of a plumbing system for the purpose of pressure testing.

SUMMARY

There is provided a pipe clamp which includes a deformable cylindrical sealing sleeve having a continuous side wall with a slotted opening extending 180 degrees around the circumference of the side wall adapted to receive a gate valve plate, the slotted opening having protruding lips bordered by clamping wedges. Means are provided for clamping the sealing sleeve to a pipe. Means are provided for exerting a clamping force with pressure members upon the clamping wedges to clamp the lips into a closed position thereby creating a fluid tight seal when the gate valve plate is removed.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

Figure 1:
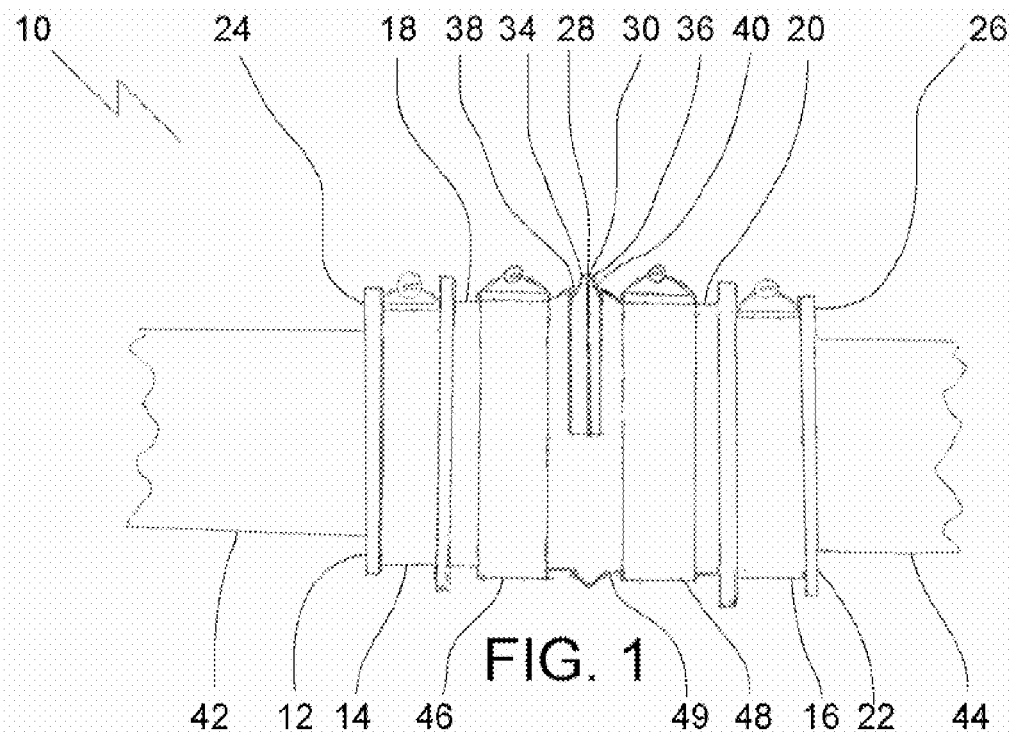
FIG. 1 is a side elevation view of a preferred embodiment of pipe clamp.

A pipe clamp generally identified by reference numeral 10, will now be described with reference to FIG. 1 through 5.

Figure 2:
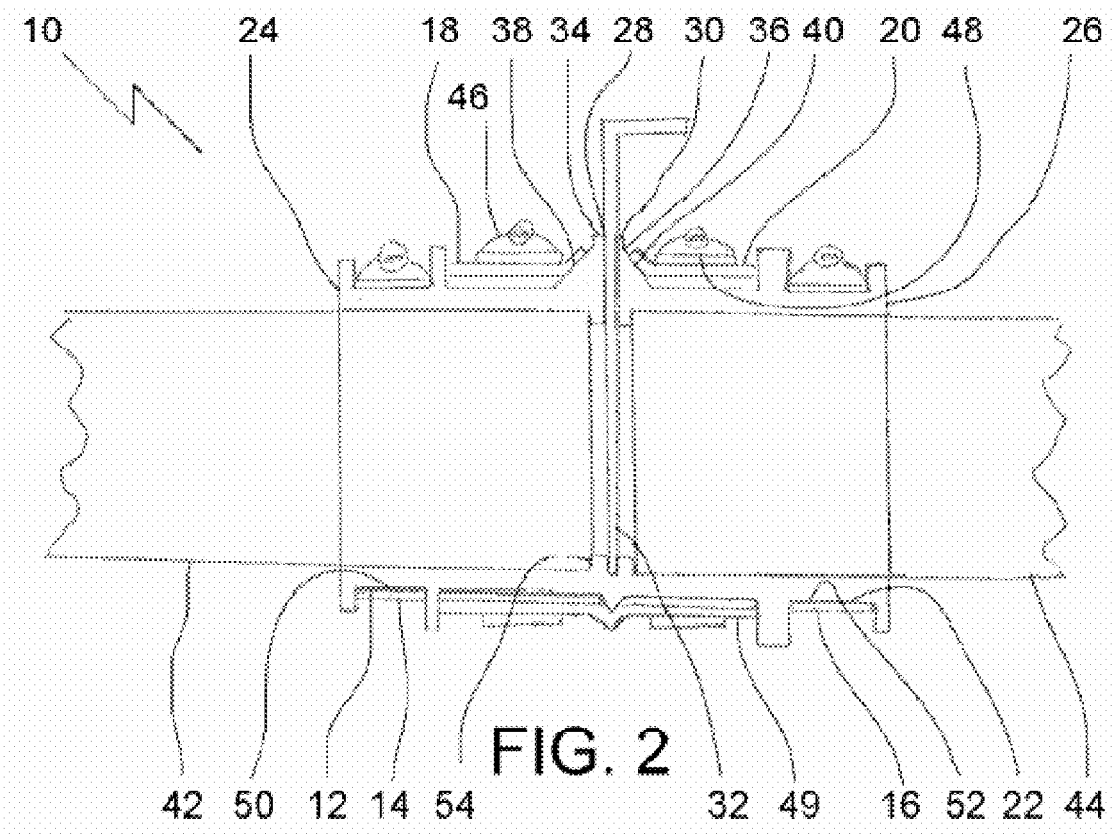
FIG. 2 is a side elevation view, in section, of the pipe clamp illustrated in FIG. 1 with gate valve plate inserted for line testing.
Figure 3:
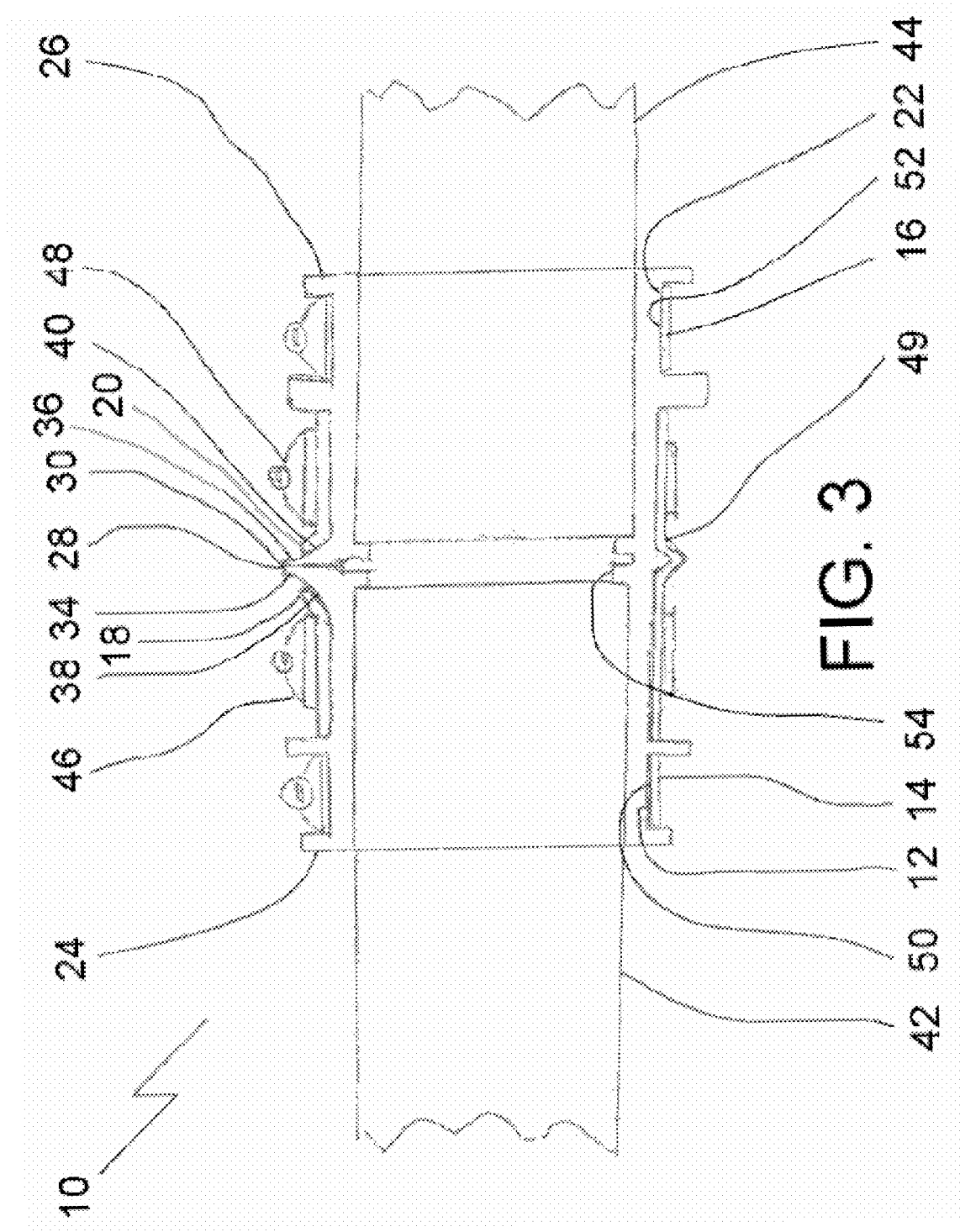
FIG. 3 is a side elevation view, in section, of the pipe clamp illustrated in FIG. 1 with gate valve plate removed and lips of slotted opening clamped closed.

Structure and Relationship of Parts:

Referring to FIG. 1, a pipe clamp 10 consists of a deformable cylindrical sealing sleeve 12, a first outer clamping band 14, a second outer clamping band 16, a first pressure member 18, and a second pressure member 20. Sealing sleeve 12 has a continuous side wall 22, a first end 24 and a second end 26. Continuous side wall 22 has a slotted opening 28. Slotted opening 28 extends 180 degrees around the circumference of side wall 22, slotted opening 28 having protruding lips 30. Slotted opening 28 is adapted to receive a gate valve plate 32 (shown in FIG. 2). Protruding lips 30 have a first side 34 and a second side 36. It should be understood that protruding lips 30 may be provided in any suitable design that can be opened to allow gate valve plate 32 to pass through slotted opening 28, and closed when a clamping force is applied. Protruding lips 30 are bordered on first side 34 by a first clamping wedge 38. Protruding lips 30 are bordered on second side 36 by a second clamping wedge 40. First outer clamping band 14 is positioned at first end 24. First outer clamping band 14 is adapted to clamp first end 24 of sealing sleeve 12 to a first pipe 42. Second outer clamping band 16 is positioned at second end 26. Second outer clamping band 16 is adapted to clamp second end 26 of sealing sleeve 12 to a second pipe 44. First pressure member 18 exerts a clamping force upon first clamping wedge 38 when first pressure member 18 is clamped by a first inner clamping band 46. Second pressure member 20 exerts a clamping force upon second clamping wedge 40 when second pressure member 20 is clamped by a second inner clamping band 48. Referring to FIG. 3, first and second inner clamping bands 46 and 48 together exert a clamping force that clamps protruding lips 30 into a closed position thereby creating a fluid tight seal when gate valve plate 32 (shown in FIG. 2) is removed. Referring to FIG. 2, first pressure member 18 and second pressure member 20 may be carried by a cover 49 that overlies sealing sleeve 12. Cover 49 carries first and second pressure members 18 and 20, respectively, as a one piece unit. Cover 49 is able to close protruding lips 30, while also maintaining the integrity of slotted opening 28 and protruding lips 30. In addition, cover 49 may be attached to sealing sleeve 12.

Referring to FIG. 3, pipe clamp 10 also contains a first annular channel 50, a second annular channel 52, and an interior flange 54. First annular channel 50 is provided at first end 24. First outer clamping band 14 is positioned in first annular channel 50. Second annular channel 52 is provided at second end 26. Second outer clamping band 16 is positioned in second annular channel 52. Referring to FIG. 2, interior flange 54 ensures that enough space is left between first pipe 42 and second pipe 44 for gate valve plate 32 to fit in between for testing. Alternatively, interior flange 54 may only extend to one side of gate valve plate 32, with a washer (not shown) placed on the other side of gate valve plate 32. The washer would protect gate valve plate 32 from contacting first or second pipe 42 or 44, respectively. The washer may be made out of plastic or any other slippery type of surface.

Operation:

Referring to FIG. 3, pipe clamp 10 can be easily installed to connect first pipe 42 to second pipe 44. First end 24 of sealing sleeve 12 is slid over first pipe 42, while second end 26 of sealing sleeve 12 is slid over second pipe 44. First pipe 42 and second pipe 44 are place into contact with interior flange 54. First and second outer clamping bands 14 and 16 are used to apply a clamping force on first and second annular channels 50 and 52, respectively. This clamping force ensures that first and second pipes 42 and 44 are securely connected to pipe clamp 10, and also provides a fluid-tight seal at first and second ends 24 and 26.

For regular use of first and second pipes 42 and 44, protruding lips 30 must be sealed. Referring to FIG. 3, first and second inner clamping bands 46 and 48 are used to apply a clamping force to first and second pressure members 18 and 20, respectively. First and second pressure members 18 and 20 in turn exert a clamping force on first and second clamping wedges 38 and 40, respectively. This action seals off protruding lips 30, forming a fluid-tight seal. With protruding lips 30, first end 24 and second end 26 sealed, first and second pipes 42 and 44 may be used.

During testing of first and second pipes 42 and 44, it may be necessary to isolate the flow in one of first and second pipes 42 or 44 in order to detect leaks. In order to do this, first pipe 42 must be sealed off from second pipe 44, as shown in FIG. 2. This is accomplished by first removing the clamping force exerted on protruding lips 30 by first and second inner clamping bands 46 and 48. With no such clamping force exerted, protruding lips 30 open up and gate valve plate 32 may be inserted within interior flange 54. Gate valve plate 32 is designed so that when inserted through slotted opening 28, it can seal off first and second pipes 42 and 44. With gate valve plate 32 in place, first and second inner clamping bands 46 and 48 are used to exert a clamping force on protruding lips 30, in order to press them up against gate valve 32, forming a fluid-tight seal through slotted opening 28. Line-testing of first and second pipes 42 and 44 may now be carried. Gate valve plate 32 is removed after the conclusion of line testing, simply be removing the clamping force, removing gate valve plate 32, and sealing off protruding lips 30.

Variations:

A preferred embodiment has been provided which has four clamping bands. It will be appreciated that the two centrally positioned clamping bands could be replaced with a single custom made clamping band. The reason that two are illustrated is that clamping bands of that type are commercially available. It will also be appreciated that having two outer clamping bands are not required. An inferior embodiment could be made with just two clamping bands, as will hereinafter be described. An inferior version with a single custom made clamping band could also be fabricated. The four band version of pipe clamp 10 is preferred as it isolates the sealing function for slotted opening 28 from the sealing function at the pipe connections. The two band version which will hereinafter be described has the sealing function for the slotted opening and the sealing function for the pipe connections performed by the same bands. This version is somewhat limiting, as the pipe connections must be loosened in order to insert the gate valve plate to perform line testing.

Figure 4:
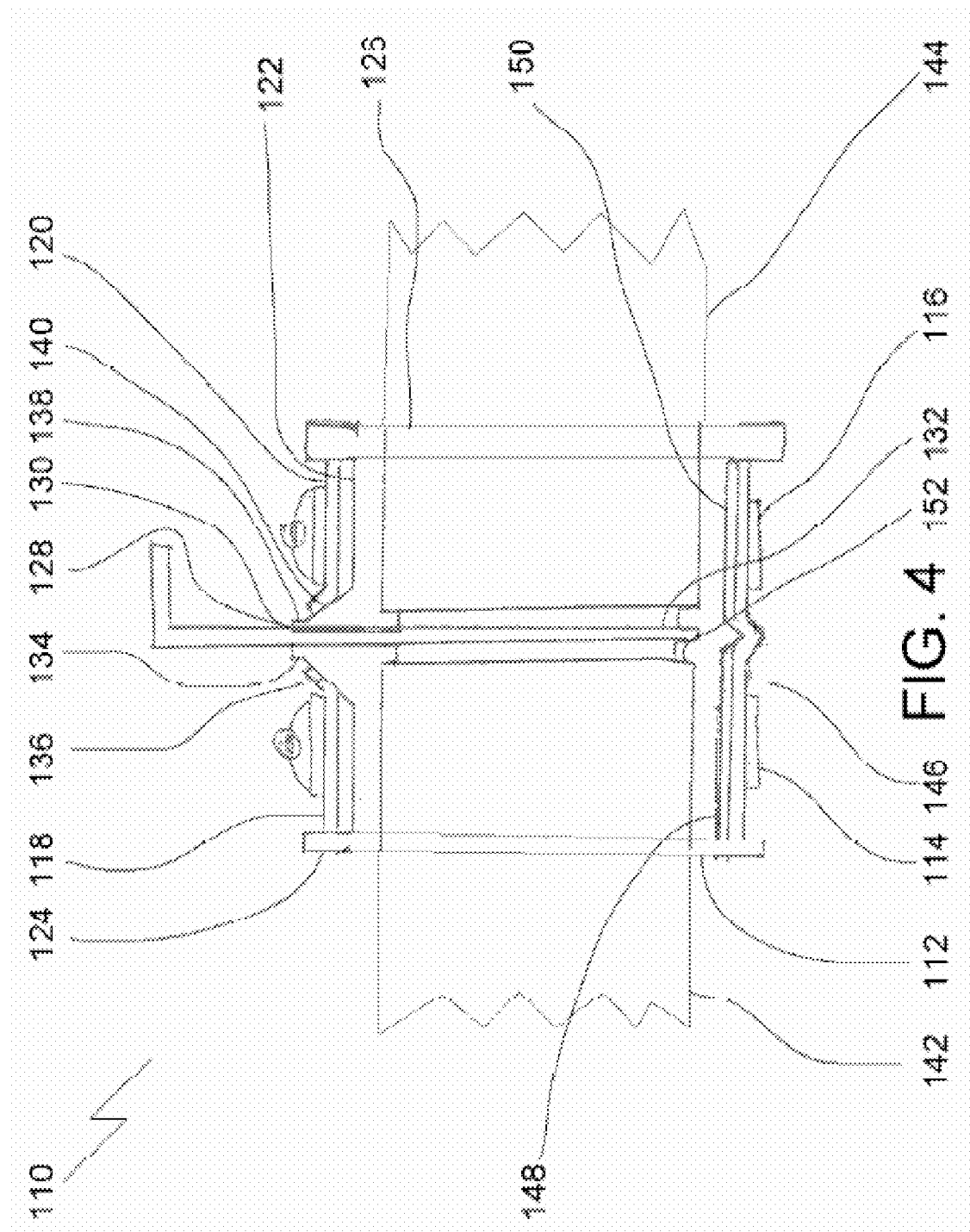
FIG. 4 is a side elevation view, in section, of an alternative embodiment of pipe clamp, with gate valve plate inserted for line testing.
Figure 5:
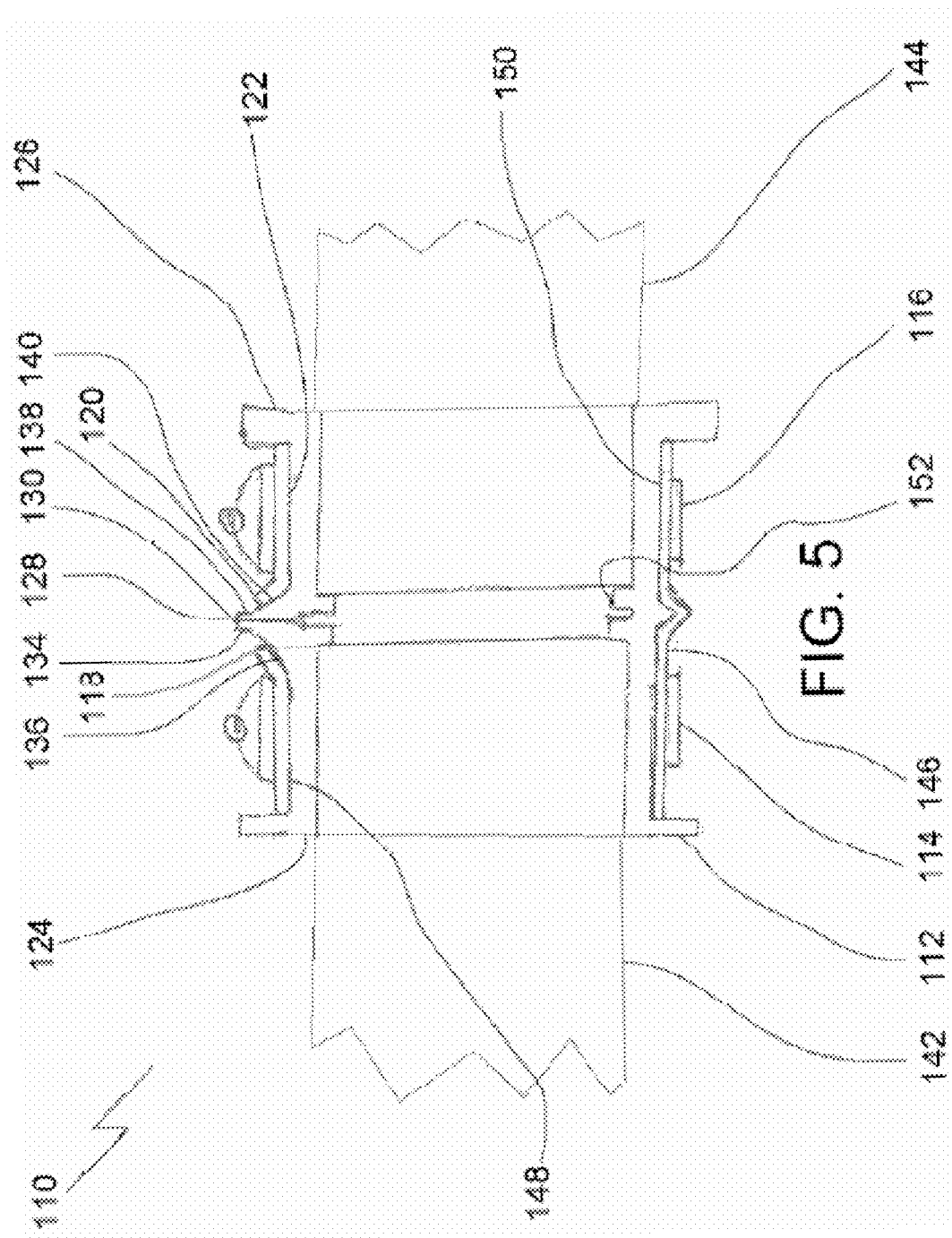
FIG. 5 is a side elevation view, in section, of the pipe clamp illustrated in FIG. 4 with gate valve plate removed and lips of slotted opening clamped closed.

Structure and Relationship of Parts:

Referring to FIG. 5, a pipe clamp 110 is provided consisting of a deformable cylindrical sealing sleeve 112, a first clamping band 114, a second clamping band 116, a first pressure member 118, and a second pressure member 120. Sealing sleeve 112 has a continuous side wall 122, a first end 124, and a second end 126. Continuous side wall 122 has a slotted opening 128 extending 180 degrees around the circumference of side wall 122. Slotted opening 128 has protruding lips 130. Referring to FIG. 4, slotted opening 128 is adapted to receive a gate valve plate 132. Referring to FIG. 5, protruding lips 130 are bordered on a first side 134 by a first clamping wedge 136. Protruding lips 130 are also bordered on a second side 138 by a second clamping wedge 140.

First clamping band 114 is positioned at first end 124 of sealing sleeve 112 to a first pipe 142. Second clamping band 116 is positioned at second end 126 of sealing sleeve 112 to a second pipe 144. First pressure member 118 exerts a clamping force upon first clamping wedge 136 when first pressure member 118 is clamped by first clamping band 114. Second pressure member 120 exerts a clamping force upon second clamping wedge 140 when second pressure member 120 is clamped by second clamping band 116. Referring to FIG. 5, first and second clamping bands 114 and 116 together exert a clamping force that clamps protruding lips 130 into a closed position thereby creating a fluid tight seal when gate valve plate 132 (shown in FIG. 4) is removed. Referring to FIG. 5, first pressure member 118 and second pressure member 120 may be carried by a cover 146 that overlies sealing sleeve 112.

Referring to FIG. 5, pipe clamp 110 also contains a first annular channel 148, a second annular channel 150, and an interior flange 152. First annular channel 148 is provided at first end 124. First clamping band 114 is positioned in first annular channel 148. Second annular channel 150 is provided at second end 126. Second clamping band 116 is positioned in second annular channel 150. Referring to FIG. 5, interior flange 152 ensures that enough space is left between first pipe 142 and second pipe 144 for gate valve plate 132 to fit in between for testing.

Operation:

Referring to FIG. 5, pipe clamp 110 is easily installed. Sealing sleeve 112 is fitted over first and second pipes 142 and 144, with first and second pipes 142 and 144 contacting interior flange 152. First and second clamping bands 114 and 116 are used to exert a clamping force on first and second clamping wedges 136 and 140, respectively. The clamping force exerted pushes protruding lips 130 shut, forming a fluid-tight seal through slotted opening 128. First and second pipes 142 and 144 are now available for regular use.

During testing of first and second pipes 142 and 144, it may be necessary to isolate the flow in one of first and second pipes 142 or 144 in order to detect leaks. In order to do this, first pipe 142 must be sealed off from second pipe 144, as shown in FIG. 4. First and second pipes 142 and 144 must be drained and the flow of fluid through them stopped before this is accomplished. The clamping force exerted upon protruding lips 130 by first and second clamping bands 114 and 116 is removed, allowing slotted opening 128 to open up. Gate valve plate 132 is then inserted into sealing sleeve 112. Finally, first and second clamping bands 114 and 116 are used to exert a clamping force on first and second clamping wedges 136 and 140, respectively. The clamping force exerted seals protruding lips 130 against gate valve plate 132, forming a fluid-tight seal through slotted opening 128. Testing can now be undertaken on first and second pipes 142 and 144.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope defined in the Claims.

What is claimed is:

1. A pipe clamp, comprising:
   a resiliently deformable cylindrical sealing sleeve having a continuous side wall with a slotted opening extending 180 degrees around the circumference of the side wall to receive a gate valve plate, the slotted opening being bordered by clamping wedges which extend radially outwardly from the sealing sleeve and terminate in protruding lips, the lips being resiliently movable between an open position for receiving the gate valve and a closed position pursed together to form a fluid tight seal or pressed against the gate valve to form a fluid tight seal;
   means for clamping the sealing sleeve to a pipe;
   pressure members on opposed sides of the slotted opening that overlie the clamping wedges; and
   means for exerting a clamping force upon the pressure members to force the clamping wedges toward each other thereby urging the lips into the closed position, the lips resiliently returning to the open position when the pressure upon the clamping wedges is released.

2. The pipe clamp of claim 1, wherein the sealing sleeve has a first end and a second end, the means for clamping the sealing sleeve to the pipe including a first clamping band positioned at the first end which clamps the first end of the sealing sleeve to a first pipe and a second clamping band positioned at the second end which clamps the second end of the sealing sleeve to a second pipe.

3. The pipe clamp of claim 2, wherein a first annular channel is provided at the first end in which the first clamping band is positioned and a second annular channel is provided at the second end in which the second clamping band is positioned.

4. The pipe clamp of claim 1, wherein a clamping force is exerted by clamping bands to bring the pressure members into clamping engagement with the clamping wedges by at least one clamping band.

5. The pipe clamp of claim 4, wherein a first pressure member acting upon a first clamping wedge on a first side of the lips is clamped by a first inner clamping band and a second pressure member acting upon a second clamping wedge on a second side of the lips is clamped by a second inner clamping band.

6. A pipe clamp, comprising:
   a resiliently deformable cylindrical sealing sleeve having a continuous side wall with a slotted opening extending 180 degrees around the circumference of the side wall to receive a gate valve plate, the slotted opening being bordered on a first side by a first clamping wedge and on a second side by a second clamping wedge, the first clamping wedge and the second clamping wedge extending radially outwardly from the sealing sleeve and terminating in protruding lips, the sealing sleeve having a first end and a second end, the lips being resiliently movable between an open position for receiving the gate valve and a closed position pursed together to form a fluid tight seal or pressed against the gate valve to form a fluid tight seal;
   a first clamping band positioned at the first end which is adapted to clamp the first end of the sealing sleeve to a first pipe;
   a second clamping band being positioned at the second end which is adapted to clamp the second end of the sealing sleeve to a second pipe;
   a first pressure member positioned on a first side of the slotted opening overlying the first clamping wedge;
   a second pressure member positioned on a second side of the slotted opening overlying the second clamping wedge;
   a third clamping band exerting a clamping force upon the first pressure member to force the first clamping wedge toward the second clamping wedge; and
   a fourth clamping band exerting a clamping force upon the second pressure member to force the second clamping wedge toward the first clamping wedge, thereby urging the lips into the closed position, the lips resiliently returning to the open position when the pressure upon the first clamping wedge and the second clamping wedge is released.

7. The pipe clamp of claim 6, wherein a first annular channel is provided at the first end in which the first clamping band is positioned and a second annular channel is provided at the second end in which the second clamping band is positioned.

8. The pipe clamp of claim 6, wherein the first pressure member and the second pressure member are integrally formed as part of a cover that overlies the sealing sleeve.

9. A pipe clamp, comprising:
   a resiliently deformable cylindrical sealing sleeve having a continuous side wall with a slotted opening extending 180 degrees around the circumference of the side wall to receive a gate valve plate, the slotted opening being bordered on a first side by a first clamping wedge and on a second side by a second clamping wedge, the first clamping wedge and the second clamping wedge extending radially outwardly from the sealing sleeve and terminating in protruding lips, the sealing sleeve having a first end and a second end, the lips being resiliently movable between an open position for receiving the gate valve and a closed position pursed together to form a fluid tight seal or pressed against the gate valve to form a fluid tight seal;
   a first outer clamping band positioned at the first end which is adapted to clamp the first end of the sealing sleeve to a first pipe;
   a second outer clamping band being positioned at the second end which is adapted to clamp the second end of the sealing sleeve to a second pipe;
   a first pressure member positioned on a first side of the slotted opening overlying the first clamping wedge;
   a second pressure member positioned on a second side of the slotted opening overlying the second clamping wedge;
   a first inner clamping band exerting a clamping force upon the first pressure member to force the first clamping wedge toward the second clamping wedge; and
   a second inner clamping band exerting a clamping force upon the second pressure member to force the second clamping wedge toward the first clamping wedge thereby urging the lips into the closed position, the lips resiliently returning to the open position when the pressure upon the first clamping wedge and the second clamping wedge is removed.

10. The pipe clamp of claim 9, wherein a first annular channel is provided at the first end in which the first clamping band is positioned and a second annular channel is provided at the second end in which the second clamping band is positioned.

11. The pipe clamp of claim 9, wherein the first pressure member and the second pressure member are integrally formed as part of a cover that overlies the sealing sleeve.

12. A pipe clamp, comprising:
   a resiliently deformable cylindrical sealing sleeve having a continuous side wall with a slotted opening extending 180 degrees around the circumference of the side wall to receive a gate valve plate, the slotted opening being bordered on a first side by a first clamping wedge and on a second side by a second clamping wedge, the first clamping wedge and the second clamping wedge extending radially outwardly from the sealing sleeve and terminating in protruding lips, the sealing sleeve having a first end and a second end, the lips being resiliently movable between an open position for receiving the gate valve and a closed position pursed together to form a fluid tight seal or pressed against the gate valve to form a fluid tight seal;
   a first outer clamping band positioned at the first end which is adapted to clamp the first end of the sealing sleeve to a first pipe;
   a second outer clamping band being positioned at the second end which is adapted to clamp the second end of the sealing sleeve to a second pipe;
   a first pressure member positioned on a first side of the slotted opening overlying the first clamping wedge;
   a second pressure member positioned on a second side of the slotted opening overlying the second clamping wedge;
   a first inner clamping band exerting a clamping force upon the first pressure member to force the first clamping wedge toward the second clamping wedge; and
   a second inner clamping band exerting a clamping force upon the second pressure member to force the second clamping wedge toward the first clamping wedge, the first pressure member and the second pressure member being integrally formed as part of a cover that overlies the sealing sleeve, the cover being clamped by the first inner clamping band and the second inner clamping band, thereby exerting a clamping force to force the first pressure member and the second pressure member to force the first clamping wedge and the second clamping wedge together thereby urging the lips into the closed position, the lips resiliently returning to the open position when the pressure upon the first clamping wedge and the second clamping wedge is released.

* * * * *